Jan. 5, 1943.  J. H. RAND, JR  2,307,469
ELECTRIC RAZOR
Filed March 16, 1939
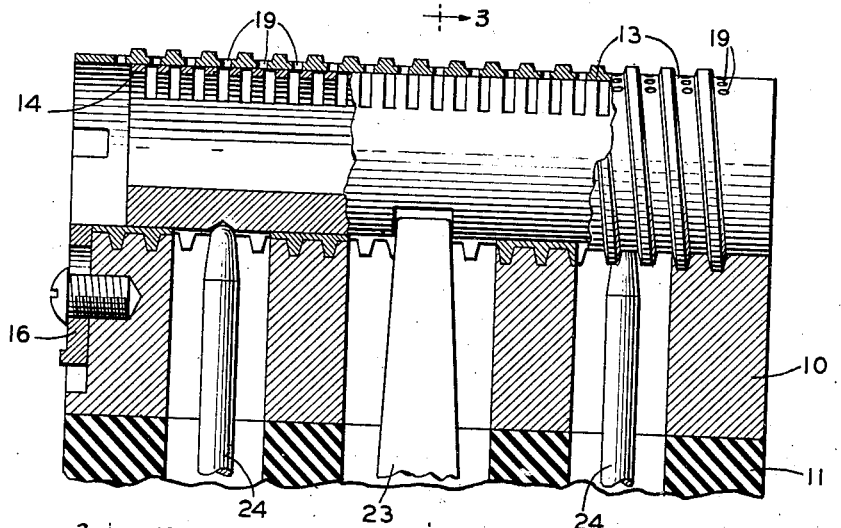
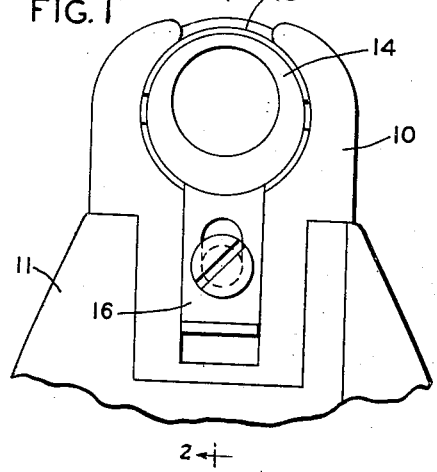
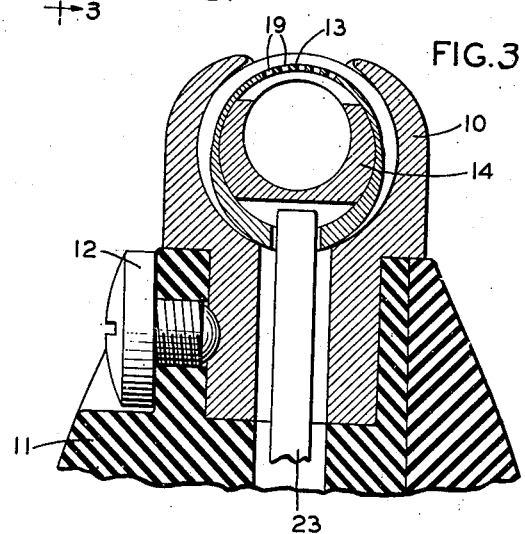
INVENTOR
J. H. RAND, JR.
ATTORNEY Patented Jan. 5, 1943

2,307,469

UNITED STATES PATENT OFFICE 2,307,469

ELECTRIC RAZOR

James H. Rand, Jr., Stamford, Conn., assignor to Remington Rand Inc., Buffalo, N. Y., a corporation of Delaware Application March 16, 1939, Serial No. 262,151

6 Claims. (Cl. 30—43)

This invention relates generally to the shearing head of electrical razors and more particularly to a supporting and strengthening means for the shearing members of the head which permits easy replacement of the shear plate.

The shaving head of the usual electrical razor is comprised of a slotted or perforated stationary shear plate and a cooperating cutter mounted within said shear plate for oscillatory or reciprocatory motion relative thereto. To insure a close shave, the contact area of the shear plate must be made extremely thin and, since this thinned portion must also be slotted or perforated, it is evident that the resulting structure is considerably weakened and that the plate might be damaged or mis-shaped, if improperly used. Also, it is apparent that an outer cutter having a thin shearing area will eventually wear to such an extent that the blades will break out, thereby necessitating the replacement of the entire shearing head. The prior art discloses numerous means and modes of construction for strengthening the shear plate but frequently it is not commercially practicable to manufacture these strengthened plates, due to the very considerable expense involved.

This invention presents a novel supporting and retaining device for a replaceable shear plate, which device contacts and encloses all the outside surface of the shear plate, except the relatively small cutting area. Means are provided for holding the shear plate against movement relatively to the retainer and, even though the plate is made extremely thin, it is supported in such a manner that there is little or no possibility of its being damaged or bent. One evident advantage of this construction is that an improved shear plate may be used in conjunction with the retainer and this plate need not be made with any great manufacturing precision.

The principal object of this invention is to make possible the use of thin inexpensive shear plates by providing a strengthening retainer therefor.

Other objects and structural details of the invention will be apparent from the following detailed description, when read in conjunction with the accompanying drawing wherein:

Fig. 1 is an end view of a shaving head constructed in accordance with the present invention.

Fig. 2 is a fragmentary, sectional view taken substantially along line 2—2 of Fig. 1.

Fig. 3 is a sectional view taken substantially along lines 3—3 of Fig. 2.

This invention is concerned with the cutting head of an electrical razor and the following description is directed only towards the illustrated form of this cutting head. The retainer 10 is supported in the upper end of the main razor casing 11 and is secured against movement by a set screw 12. The retainer is preferably constructed of metal but a composition material, such as that of which casing 11 is usually formed, could be used if desired. The retainer 10 is formed as a block in either a one or two part construction and its opposite sides extend upward in arcuate prongs or jaws to form a channel or bore which is open at the top. A shear plate and an inner cutter are also shown in the drawing and these elements are given the respective reference characters 13 and 14. It will be noted that the jaws of the retainer contact the entire outer surface of the shear plate, excepting, of course, the shearing area at the top, and thus serve as an unusually efficient support for the plate. In effect, the shear plate thus bridges or closes the channeled portion of the retainer.

The shear plate 13 is tubular in form and its outer surface is threaded. As shown in Fig. 3, the threads on the plate 13 gradually diminish in height as they extend upward, and at the top of the plate, between the threads, a series of perforations 19 are cut. This type of shear plate is replaced by screwing it into the retainer 10 where it is held in position by the locking plate 16. It will be evident that a threaded shear plate of this construction is much less flexible than the usual type of plate and it will further be evident that because of this rigidity the perforated portions of the plate may be made extremely thin to secure a more efficient cutting action.

Cooperating with the shear plate 13 is an appropriately formed cutter member 14, the upper surface of which is cut to form a plurality of shearing elements. As shown in Fig. 2 an operating arm 23 extends through openings in the retainer 10 and shear plate 13 and engages the cutter member 14. The arm 23 is rocked under motor control, in the usual manner, to move the cutter 14 relatively to the shear plate 13. The cutter is spring-pressed into contact with the shearing plate by a pair of pins 24 which also extend through openings in the retainer and shear plate.

While there is above described but one embodiment of the invention, it is possible to produce other embodiments without departure from the inventive concept above disclosed, and it is, therefore, desired that only such limitations shall be imposed on the appended claims as are stated therein, or required by the prior art.

What I claim as new, and desire to secure by Letters Patent, is:

1. A shaving head comprising a retainer having jaws defining a channeled portion thereof, a threaded fixed outer shear plate supported within said channeled portion and by the jaws of said retainer, and an inner cutter mounted for relative movement within said outer shear plate.

2. A shaving head comprising a retainer having jaws defining a channeled portion thereof, a threaded fixed outer shear plate supported within said channeled portion and by the jaws of said retainer, said shear plate having cutting elements formed between the threads thereof, and an inner cutter mounted for relative movement within said outer shear plate.

3. A shaving head comprising a retainer having jaws defining a channeled portion thereof, a threaded fixed outer shear plate corresponding in shape to said channeled portion and removably supported therein and by the jaws of said retainer, a portion of said threaded shear plate bridging said channeled portion and having cutting elements formed thereon between the threads thereof, and an inner cutter mounted for relative movement within said outer shear plate.

4. In a mechanical razor, a shear plate of varying thickness, the outer surface of which is threaded and which has a plurality of perforations cut between each of the threads in the thinnest portion of the plate.

5. A shaving head comprising a retainer having threaded jaws, an outer shear plate having threads cooperating with the threads of said jaws, and releasable means for retaining said shear plate against removal from said jaws.

6. A shaving head comprising an outer shear plate having external threads thereon, and shearing elements formed by perforations between the threads of said shear plate.

JAMES H. RAND, Jr.